United States Patent [19]

Kamiya

[11] Patent Number: 4,947,346
[45] Date of Patent: Aug. 7, 1990

[54] WORD PROCESSOR DISPLAYING INSTRUCTIONS BY MONITORING USER'S KEY OPERATIONS

[75] Inventor: Shin Kamiya, Nara, Japan

[73] Assignee: Sharp Kabushiki Kaisha, Osaka, Japan

[21] Appl. No.: 443,819

[22] Filed: Nov. 29, 1989

Related U.S. Application Data

[63] Continuation of Ser. No. 201,640, Jun. 2, 1988, abandoned.

[30] Foreign Application Priority Data

Jun. 29, 1987 [JP] Japan ................................ 62-161510

[51] Int. Cl.⁵ .............................................. G06F 3/02
[52] U.S. Cl. .................................... 364/521; 364/900; 341/22

[58] Field of Search ................ 364/518, 521, 900; 341/22

[56] References Cited

U.S. PATENT DOCUMENTS 4,523,298  6/1985  Sakurai ................... 364/900
4,648,062  3/1987  Johnson et al. ......... 364/900
4,789,962  12/1988  Berry et al. ............. 364/900

Primary Examiner—David L. Clark
Attorney, Agent, or Firm—Flehr, Hohbach, Test, Albritton & Herbert

[57] ABSTRACT

A word processor stores sequences of key operations corresponding to its many word processing functions and monitors the sequence of key operations by the user. If it is found that the user has operated keys in one of the stored sequences for a specified number of times, sentences explaining the corresponding function of the word processor are displayed.

5 Claims, 2 Drawing Sheets

WORD PROCESSOR DISPLAYING INSTRUCTIONS BY MONITORING USER'S KEY OPERATIONS

This is a continuation of application Ser. No. 201,645, filed June 2, 1988, now abandoned.

BACKGROUND OF THE INVENTION

This invention relates to a word processor which monitors the user's key operations and thereby reminds the user, by making a display of explanatory sentences at appropriate times, of its functions the user may not have been aware of.

Most word processors are provided with a large number of word processing functions for making it possible to easily and rapidly form sentences in different formats. In order to make use of these functions, the user is usually required to operate a function key, a control key and/or a special key in various combinations. As word processors with increased numbers of functions are developed, their instruction books become thicker and it is frequently impossible for the user to learn, understand and memorize all available instructions.

SUMMARY OF THE INVENTION

It is therefore an object of the present invention to provide a word processor which automatically detects the user's wasteful key operations for making use of its functions and displays explanatory sentences at appropriate times to teach the user how better to operate the keys.

A word processor embodying the present invention with which the above and other objects can be achieved is structured, as shown schematically in FIG. 1, with a key input means 1 having a plurality of key switches, a display means 2 for displaying information of various kinds, and a principal control means 3 for performing various kinds of word processing in response to signals from the key input means 1, as well as an operation memory means 4, a function judging means 5 and a display output means 6. Whenever key switches of the key input means 1 are operated in one of specified sequences, the operation memory means 4 stores not only this sequence but also the number of times these key switches have been operated in this same sequence and this frequency number is compared with a predefined reference number. If this frequency number is found to have reached or exceeded the corresponding reference number, the judging means 5 determines which of the functions available to the word processor was intended by the sequence of key operations stored in the operation memory means 4. Sentences explaining the method of using the word processing function identified by the function judging means 5 are caused to be displayed on the display means 2 by the display output mean 6.

In summary, if a certain sequence of key operations is repeated for a predefined number of times, sentences explaining the function corresponding to the word processing which can be performed by this sequence of key operations are displayed, thereby teaching the user a more appropriate method of word processing.

BRIEF DESCRIPTION OF THE DRAWINGS

The accompanying drawings, which are incorporated in and form a part of the specification, illustrate an embodiment of the present invention and, together with the description, serve to explain the principles of the invention. In the drawings.

DETAILED DESCRIPTION OF THE INVENTION

In what follows, the present invention is described by way of an example but the scope of the present invention is by no means intended to be limited by this illustrative example.

Figure 1:
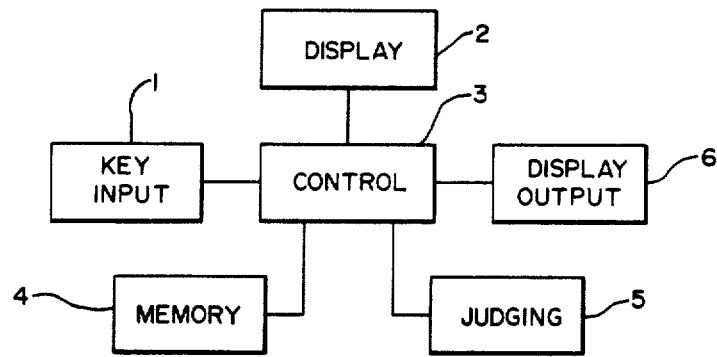
FIG. 1 is a block diagram showing the structure of a word processor of the present invention.
Figure 2:
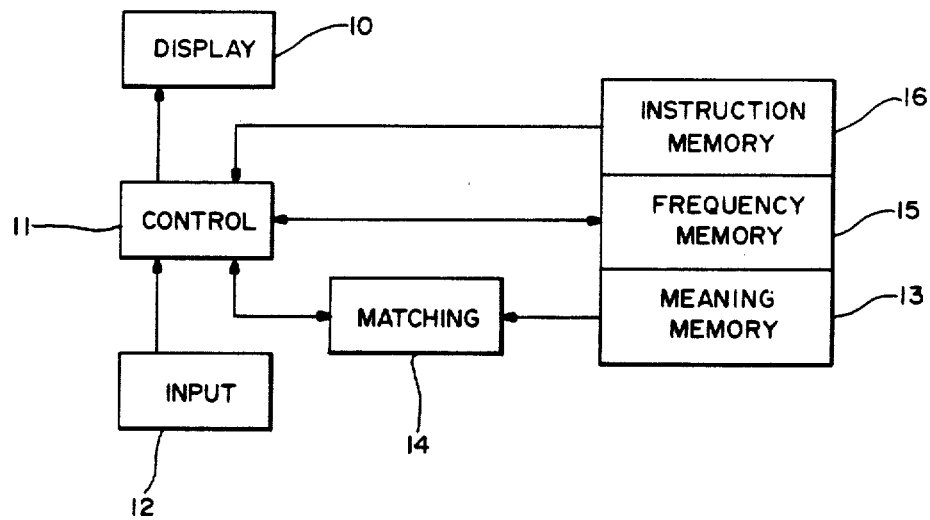
FIG. 2 is a block diagram showing an embodiment of the present invention.

In FIG. 2 which is a block diagram of a Japanese language word processor embodying the present invention, numeral 10 indicates a display device having, for example, a cathode ray tube as its display means for displaying data of various kinds in response to signals received from a control unit 11. The control unit 11 may be comprised of an 8-bit microcomputer, a read-only memory which stores programs for carrying out word processing functions of various kinds and controlling the full apparatus and interface circuits with the display device 10 and other components to be explained below. Numeral 12 indicates an input device which is comprised essentially of a keyboard connected to the control unit 11, having thereon kana/alphabet keys, numeric keys, function keys and other types of keys. Numeral 13 indicates a function meaning memory which may be comprised of a read-only memory with a smaller capacity. The meaning of each function of this word processor is described by a symbol array and stored in this function meaning memory 13. Numeral 14 indicates a matching section and, when keys of the input device 12 are operated, serves to match the character code array outputted by the control unit 11 corresponding to the key operation with one of the symbol arrays stored in the function meaning memory 13. Numeral 15 indicates a frequency memory. The number of times each of the functions of the word processor has been thus matched by the matching section 14 is transmitted through the control unit 11 and stored in this frequency memory 15. Numeral 16 indicates an instruction memory which stores the explanation of each function such as its meaning and the method of using it.

When a user operates the input device 12 in order to form a sentence, the key code corresponding to each of the operated keys is transmitted from the input device 12 to the control unit 11. Thereupon, the control unit 11 not only transmits the sentence to the display device 10 (by using its kana-kanji conversion function to convert the input kana sentence into a regular Japanese sentence containing both kana, or phonetic symbols, and kanji, or ideographical symbols) but also transmits the corresponding character code array to the matching section 14. The aforementioned symbol arrays representing the meanings of various functions and prerecorded in the function meaning memory 13 are already retrieved into the matching section 14 and the character code array control unit 11 is matched with one of these symbol arrays.

To explain the aforementioned symbol arrays more in detail, each word processing function is represented by an array of symbols. For example, vertical bar "|" is assigned the meaning of an alternative "or" and { } is assigned the meaning of repetition with the subscript given thereto indicating the number of repetitions. The operation of erasing 10 characters which have just been written, for example, can thus be represented by the symbol array {<BACK>|<DELETE>}₁₀ where <BACK> and <DELETE>(<B represent the standard keys on Japanese word processors for moving the cursor backward while erasing the entered characters and for erasing the character at the position of the cursor, respectively.

Next, the use of the so-called "indent function" whereby a specified number of successive lines are indented by a specified number of spaces is explained in detail. In particular, let us assume that it is desired to indent 3 lines by 7 spaces. In order to accomplish this result, the user would have to operate the RETURN key to change lines first, use the SPACE key and the TAB key next to insert 7 spaces at the head of the line and then repeat this sequence three times. This sequence may be represented by the following symbol array:

{<RETURN><SPACE ARRAY
><CHARACTER ARRAY>}₃ L<SPACE
ARRAY>=CONSTANT where "&" is used as a symbol placed before a constraining condition and "L" and "=" are symbols indicating the length of the symbol array sandwiched therebetween. In the example under consideration, "L<SPACE ARRAY>=CONSTANT" adds the constraining condition that a constant number (=7) of spaces are to be inserted. The function meaning memory 13 stores symbol arrays like this for all available functions.

Figure 3:
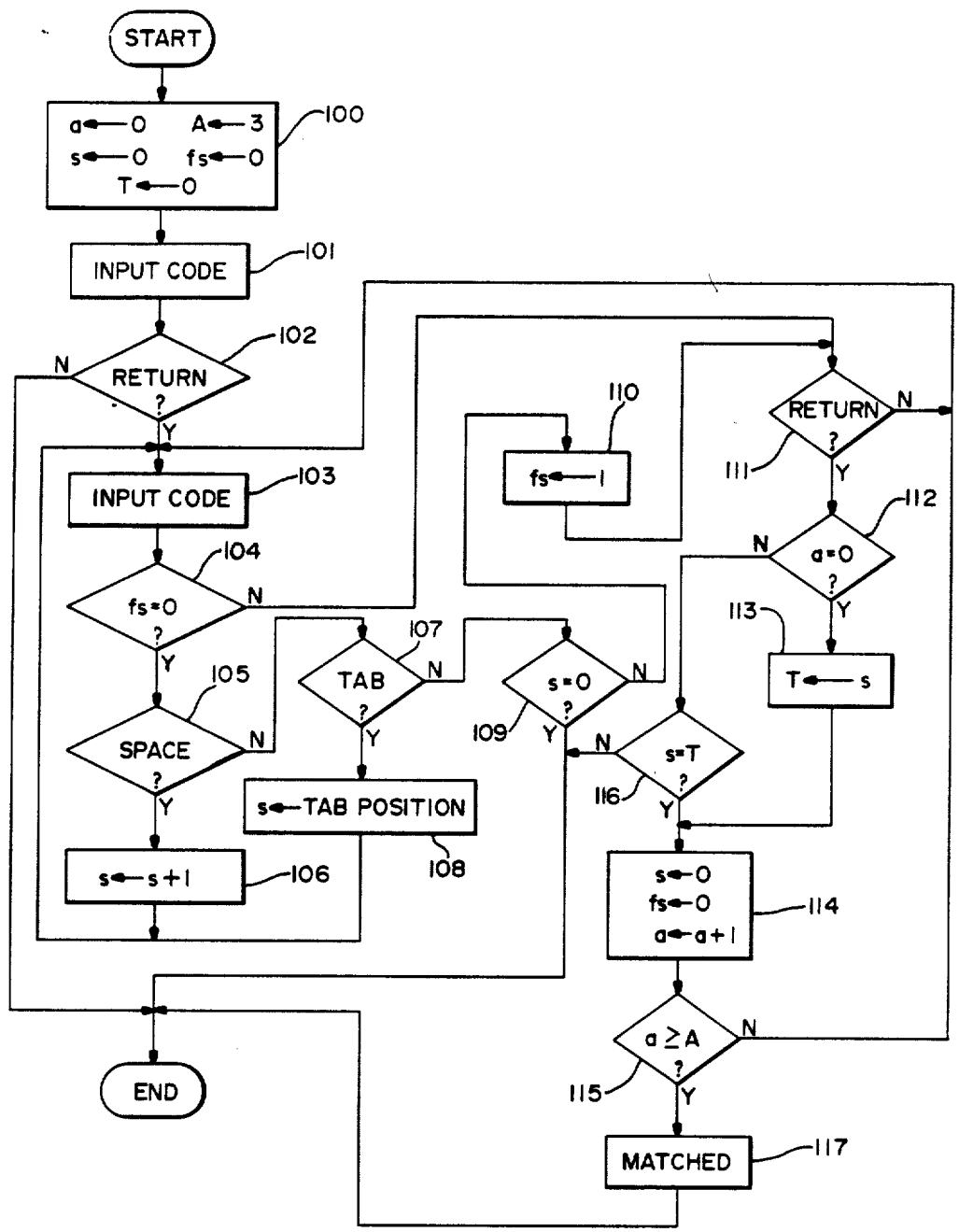
FIG. 3 is a flowchart for the key matching operation for the indent function performed according to the present invention.

Let us consider situations where a user attempts to indent three lines by seven spaces without using the available indent function. FIG. 3 is a flowchart of the operation of the matching section 14 whereby the key operation by the user is monitored regarding the indent function. This operation is described next in detail as an example of how the matching section 14 functions.

When the word processor is put in the input mode of operation for making a document, the parameter "a" representing the number of repetitions to be described below, the reference number "A" representing the lower limit value for "a", the variable "s" which is a space counter, the parameter "fs" which is a flag for indicating whether there is a space or not at the head of the line, and the parameter "T" representing the number of spaces at the head of the line are respectively set by way of initialization to 0, 3, 0, 0 and 0 (Step 100). When the user operates keys on the input device 12, the key codes corresponding to the operated keys are received by the control unit 11 (Step 101). The monitoring program associated with the aforementioned indent function keeps examining whether the RETURN key is among the operated keys (Step 102). If it is found that the RETURN key has not been operated (NO in Step 102), the program concludes that the user is not intending to perform an indent operation.

If the key code corresponding to the RETURN key is detected, the key code received next (Step 103) is examined. First, the flag fs is examined (Step 104) but since fs=0 in this case, the program proceeds to Step 105 and examines whether it was the SPACE key that was operated. If it was the SPACE key (YES in Step 105), the space counter s is incremented (Step 106). This is repeated as long as the operation of the SPACE key is continued. Finally, when the user operates the TAB key and its corresponding key code is received (NO in Step 105 and YES in Step 107), the value of the space counter s at this moment is understood to represent the tab position (Step 108).

If the answer in Step 107 is NO, the space counter s is examined (Step 109) and if s=0, the program concludes that the user was not intending to indent this line. If s is not 0 in Step 109, the flag fs is set to 1 (Step 110) and it is checked whether the RETURN key has been operated (Step 111). Thereafter, if the user continues to type in characters to be printed in the indented line, the program goes back from Step 111 to Step 103 and repeats the cycle from Step 104 to Step 111 until the user operates the RETURN key again. When the user next operates the RETURN key and the corresponding key code is detected (YES in Step 111), the program examines whether this is the first (a=0) of the lines to be indented (Step 112) and if this is so, the content of the counter s is set as the length T of the spaces at the head of the line (Step 113) before the counter s and the flag fs are reset to 0 and the parameter "a" is incremented (Step 114). This incremented parameter value "a" is thereafter compared with the reference value "A" (Step 115) and if "a" has not exceeded "A" yet, the program returns to Step 103.

In Step 112, if the parameter "a" is found to be non-zero, or if the series of key operations corresponding to the symbol array {<RETURN><SPACE ARRAY><CHARACTER ARRAY>} is in the second or third cycle of repetition, the content of the counter s and the length T of the space array are compared (Step 116) and if they are equal, Step 114 is performed. If the incremented parameter "a" is found to have reached or exceeded the value of "A" in Step 115, it is concluded that the character code array transmitted from the control unit 11 has matched the symbol array for the indent function (Step 117). If the program reaches Step 117, the matching section 14 sends a signal to this effect to the control unit 11 and the control unit 11 responds by causing the counter value corresponding to the indent function in the frequency memory 15 to be increased by one. This is a counter exclusively assigned to the indent function and serves to count the number of times the user's key operation matched the symbol array for the indent function stored in the function meaning memory 13. The frequency memory 15 not only includes counters like this for the other available functions of the word processor but also stores a reference value for each of these functions for which such counters are provided. When the counter value for any of the functions has reached the corresponding reference value or an integral multiple thereof, the control unit is instructed to load the corresponding explanation related to that function stored in the instruction memory 16 and to display it on the display device 10, for example, by using a window function to create an area on the screen on which such a display of instruction can be made, thereby reminding the user that the word processor has a corresponding function available although the user may not have known it. The explanation may be expressed in simple sentences, preferably including an example of key operations for carrying out this function.

Although the present invention has been explained principally for the case of the indent function, it is to be understood that similar programs for the other functions such as those for erasing a specified number of characters, for drawing a horizontal ruled line, for copying, etc. are stored in the function meaning memory 13 such that the user's key operations for all available functions can be monitored. With a word processor thus structured and programmed, the user is not required to memorize all available functions for word processing. Whenever the user operates the keys in a wasteful manner for a result which can be more easily achieved by using one of the available functions, the word processor automatically detects a wasteful key operation and reminds the user by displaying instructions. In summary, the present invention provides a word processor with a CAI (computer-aided instruction) or an AI (artificial intelligence) function.

What is claimed is:

1. A word processor comprising
a key input means having a plurality of keys,
a display means for displaying data,
a control means programmed to perform many word processing operations in response to signals outputted from said key input means according to specified sequences in which said keys are operated, each of said word processing operations having a reference minimum number associated therewith,
a result storing means connected to said control means for incrementing, whenever said keys of said key input means are operated for one of said word processing operations, a frequency number representing the number of times said keys were previously operated for said one of said word processing operations, and
a judging means connected to said control means for, judging whether said frequency number exceeds the corresponding one of said reference minimum numbers associated with said one of said word processing operations, said control means being further programmed to automatically cause said display means to display, if said judging means determines that said frequency number exceeds said corresponding one of said reference minimum numbers, the identity of one of said word processing operations and information related to said one of said word processing operations.

2. The word processor of claim 1 further comprising an instruction storing means for storing explanations of all available functions of said word processor inclusive of said information.

3. The word processor of claim 1 further comprising a sequence storing means for storing said specified sequences.

4. The word processor of claim 3 wherein said sequence storing means stores each of said specified sequences as a symbol array.

5. The word processor of claim 1 wherein said control means includes a microcomputer and a read-only memory which stores a program for said microcomputer.

* * * * *

UNITED STATES PATENT AND TRADEMARK OFFICE
CERTIFICATE OF CORRECTION

PATENT NO. : 4,947,346

DATED : August 7, 1990

INVENTOR(S) : Shin Kamiya

It is certified that error appears in the above-identified patent and that said Letters Patent is hereby corrected as shown below:

Column 3, line 6, after "<DELETE>", delete --(<B--.

Column 4, line 6, change "0in" to read --0 in--.

Signed and Sealed this

Fourth Day of February, 1992

Attest:

HARRY F. MANBECK, JR.

*Attesting Officer*     *Commissioner of Patents and Trademarks*